United States Patent [19]

Scott et al.

[11] Patent Number: 4,617,431
[45] Date of Patent: Oct. 14, 1986

[54] VOICE TUBE ASSEMBLIES FOR POST-AURICLE HEADSETS

[75] Inventors: Charles G. Scott; Robert L. Harris, both of Aptos, Calif.

[73] Assignee: Plantronics, Inc., Santa Cruz, Calif.

[21] Appl. No.: 557,432

[22] Filed: Dec. 2, 1983

[51] Int. Cl.⁴ .............................................. H04M 1/05
[52] U.S. Cl. ................................. 179/156 A; 381/91; 181/20
[58] Field of Search ................. 179/156 A, 149, 152, 179/107 H; 181/20, 21, 22; 381/91, 69

[56] References Cited

U.S. PATENT DOCUMENTS

| | | | |
|---|---|---|---|
| 2,930,856 | 3/1960 | Toht | 179/107 H |
| 3,633,705 | 1/1972 | Teder | 179/156 A |
| 3,735,021 | 5/1973 | Bonis | 179/156 A |
| 4,020,297 | 4/1977 | Brodie | 179/156 A |
| 4,090,042 | 5/1978 | Larkin | 179/156 A |
| 4,118,606 | 10/1978 | Larkin | 179/156 A |
| 4,273,969 | 6/1981 | Foley | 179/156 A |
| 4,289,938 | 9/1981 | Zichy | 179/156 A |
| 4,335,281 | 6/1982 | Scott | 179/156 A |

FOREIGN PATENT DOCUMENTS

| | | |
|---|---|---|
| 716801 | 10/1954 | United Kingdom . |
| 731830 | 6/1955 | United Kingdom . |
| 1306999 | 2/1973 | United Kingdom . |
| 1334183 | 10/1973 | United Kingdom . |
| 2039191 | 7/1980 | United Kingdom ........... 179/107 H |

Primary Examiner—Gene Z. Rubinson
Assistant Examiner—L. C. Schroeder
Attorney, Agent, or Firm—Arnold, White & Durkee

[57] ABSTRACT

A new voice tube assembly for post-auricle headsets is disclosed. In one aspect of the invention, first and second curved, rigid tubular sections are employed to connect a flexible main voice tube section with the top of a post-auricle capsule containing a microphone and a receiver. The curved, rigid tubing sections are rotatable to maximize positional flexibility. In a second aspect of the invention, a shaping wire is included throughout a substantial portion of the length of the main voice tube section. The shaping wire is employed in order to permit the use of thinner and lighter material for the main voice tube section, and to facilitate shaping of the main voice tube section to the geometry of the wearer's face and locating of the open end of the main voice tube section adjacent the wearer's mouth.

5 Claims, 2 Drawing Figures

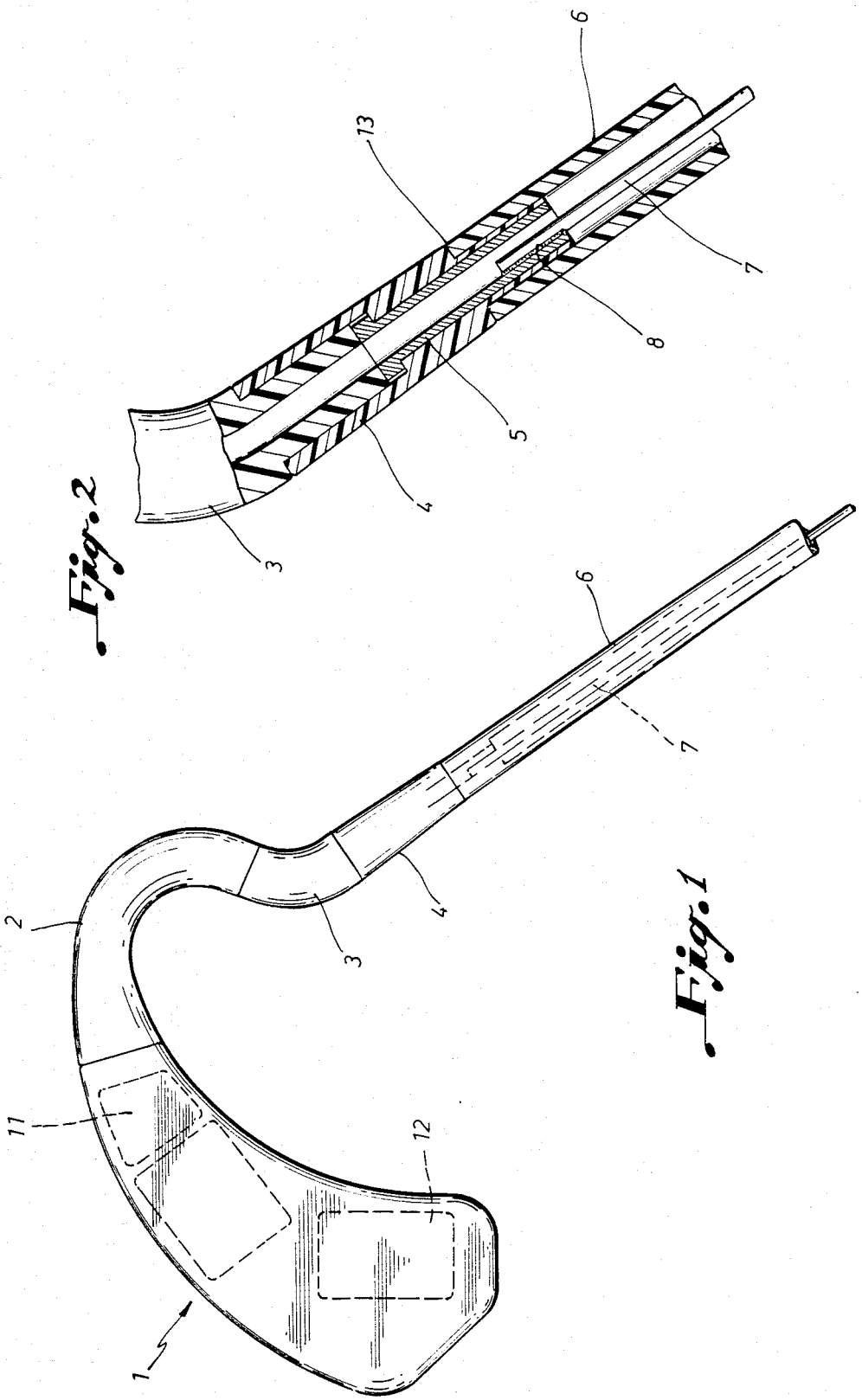

VOICE TUBE ASSEMBLIES FOR POST-AURICLE HEADSETS

FIELD OF THE INVENTION

This invention relates to voice communication headsets, i.e., those which are used to convert the wearer's voice into electrical signals which are conveyed over an electrical line and then reconverted to audible signals at the listener's end of the line. Such headsets may also receive incoming electrical signals representative of the other party's speech, and include means to convert these signals to sound audible to the headset wearer.

BACKGROUND OF THE INVENTION

Small, lightweight headsets for communications usage have been known for many years. A large proportion of such headsets currently are of the post-auricle type, i.e., having a housing or capsule which fits behind the ear of the wearer, the capsule containing at least a microphone and sometimes also a receiver. Various acoustic tube arrangements are employed to pick up the wearer's speech from a location near his mouth and convey it to the microphone; and to convey receiver sounds to the wearer's auditory canal. Examples of such post-auricle headsets are those shown in U.S. Pat. No. 3,548,118 to Hutchings, and U.S. Pat. No. 4,335,281 to Scott, et al.

In the headset industry, there has been a fairly consistent trend toward the use of ever smaller and lighter components, in an effort to make headsets more comfortable during long periods of use, such as encountered by telephone operators, reservations personnel, aircraft crews, etc. Accompanying this trend have been the ever-present considerations of stability and versatility. With regard to stability, the problem centers around keeping the headset in a fixed position on the wearer's head, so that sound volume will not be adversely affected due to shifting of the location of the open end of the voice tube away from the wearer's mouth, and so that the wearer will not have the disconcerting feeling of movement of the unit on his ear, and the accompanying sense of the unit being about to fall off. With regard to versatility, a major design consideration centers around being able to locate the open end of the voice tube at a point close to the corner of the wearer's mouth, while at the same time being able to wear the headset alternately on either side of the head.

SUMMARY OF THE INVENTION

In one aspect of the present invention, greater user comfort is achieved by permitting use of a lighter and smaller capsule and a lighter-weight voice tube, while maintaining or improving stability through the use of a double-curvature ear-hook-and-voice tube arrangement. Two rotatably mounted curved pieces in the voice tube assembly actually serve as part of the ear hook, and are arranged to permit the assembly to be rotated with respect to the transducer housing, and also to be rotatable in a direction approximately 90° from that first rotation axis. A maximum of versatility is thereby achieved.

In another aspect of the present invention, use of a thinner and lighter material for the main voice tube section is permitted, while simultaneously permitting the quick and convenient locating of the open end of the tube near the wearer's mouth. This is achieved through the inclusion of a shaping wire within the main voice tube section. Tube and wire can be conveniently bent by the wearer so as to fit the tube approximately to the contour of the wearer's face, and to locate the open end of the tube near the corner of the wearer's mouth for voice pickup.

BRIEF DESCRIPTION OF THE DRAWINGS

FIG. 1 is an enlarged illustration of a post-auricle headset according to the present invention.

FIG. 2 is an enlarged section showing details of a connection between a voice tube and a post-auricle headset.

DESCRIPTION OF THE PREFERRED EMBODIMENT

Although the invention can be implemented in a variety of ways within the scope of the appended claims which define the invention, the presently preferred embodiment of the invention will now be described. Referring to FIG. 1 of the drawings, a post-auricle capsule 1 is shown. This capsule contains a microphone 11 and a receiver 12. (Transmit-only headsets would include only the microphone 11.) In headset configurations employing the so-called boom-microphone arrangement, the capsule would contain only the receiver 12, with the microphone being mounted at the distal end of the voice tube assembly, with thin electrical leads passing through the voice tube assembly to some point in the capsule where they are joined to a cable for transmission onto a telephone line or other communication medium. It should be understood that, in the context of the present application, "voice tube assemblies" are generic to all of these arrangements, and "voice signals" can be in either sound form or in the form of electrical signals on a wire.

Attached to the capsule 1 is a first curved tube section 2, which is rotatable with respect to the capsule 1. The tube section 2 is of relatively stiff material, preferably plastic. It acts as an over-the-ear hook for supporting the total headset assembly, while also serving the functions of conveying voice sound (or lead wires in the case of a boom-microphone configuration) and permitting positional adjustment of the voice tube assembly. A second curved tube section 3, which may also be made of relatively stiff plastic material, is rotatably connected to the first tube section 2. It will be noted that the axis of rotation between the capsule 1 and the first tube section 2, and the axis of rotation between the first and second tube sections 2 and 3, are at a substantial angle to each other, approximating 90°. This permits a large range of position-adjusting versatility in the three-dimensional sense.

A first adapter member 4, which may also be of rigid plastic, serves to connect a narrowed outer portion of the second tube section 3 with the main voice tube section 6. This is accomplished through the inclusion of a steel tube adapter 5, of the geometry shown in FIG. 2, over which the main voice tube section 6 is closely fitted as shown. The connected end of the main voice tube section 6 closely abuts one end of the plastic adapter 4 to form the junction 13. Thus, the steel adapter tube 5 is closely held in its axial position within the interior of the voice tube assembly. The presence of this fixed-position steel adapter tube 5 facilitates the mounting of a shaping wire 7 within the interior of the main voice tube section 6. The shaping wire 7 may be, for example, 0.030 diameter annealed stainless steel wire, soldered to the steel tubing adapter 5 at the location shown at 8.

The shaping wire 7 should extend through a sufficient portion of the length of main tubing section 6 to provide convenient shaping of main tubing section 6 to the facial geometry of the wearer, so that the distal end of main tubing section 6 can be located near the corner of the wearer's mouth.

In operation, the user conveniently locates the capsule 1 behind his ear (either left or right), rotates the plastic sections 2 and 3 for optimum location of the fixed end of the main voice tube section 6; then completes the adjustment by shaping the main tubing section 6 with his fingers. These operations would normally not have to be repeated each time the headset is placed on the ear, but only when the user wishes to move the headset from one ear to the other, or when a different user is involved.

Received sound may be conveyed from the receiver 12 in the headset capsule 1 to the wearer's ear canal via a flexible acoustic tube (not shown) or by other means. Electrical leads to the receiver and from the microphone are conducted to the capsule 1 by means of a flexible multiwire electrical cable (not shown).

It will be understood by persons skilled in the art that numerous modifications and variations of the above-described embodiment of the invention can be made, within the wording and spirit of the appended claims. For example, the second curved tubing section 3 and the main voice tube may be made integrally, in a single piece.

We claim:

1. A voice tube assembly for a communications headset including a post-auricle capsule, comprising (a) a first curved, relatively rigid tubing section, adapted for connection and rotation relative to said post-auricle capsule;
   (b) a second curved, relatively rigid tubing section rotatably connected to said first tubing section; said first tubing section being adapted to hang over a wearer's ear and said first and second tubing sections being adjustable to substantially conform to a wearer's head and ear and adapted to convey voice signals into said capsule.

2. The apparatus of claim 1, further including a main voice tube section connected to said second curved tubing section and having substantially more flexibility than said first and second curved tubing sections, the distal end of said main voice tube section being locatable adjacent the wearer's mouth.

3. The headset of claim 1, wherein said voice tube assembly further includes a microphone mounted at the end of said assembly away from said capsule, and a lead wire within said assembly from said microphone to said capsule.

4. The headset of claim 2, further comprising a shaping wire located within said main voice tube section and extending along a substantial portion thereof, for shaping said main voice tube portion to the geometry of the wearer's face and for positioning the distal end of said main voice tube section adjacent the wearer's mouth by bending said shaping wire and said main voice tube section.

5. The headset of claim 4, wherein said voice tube assembly further includes a microphone mounted at the end of said assembly away from said capsule, and a lead wire within said assembly from said microphone to said capsule.

* * * * *